United States Patent
Black et al.

(10) Patent No.: US 8,707,616 B1
(45) Date of Patent: Apr. 29, 2014

(54) CONTROLLING BED BUGS WITH SOLVENT VAPORS

(75) Inventors: Bruce C. Black, Yardley, PA (US); Shreya N. Sheth, Lawrenceville, NJ (US); Linda A. Varanyak, Mercerville, NJ (US); Kenneth W. Johnson, Lindenwold, NJ (US); Michael J. Manning, Morrisville, PA (US)

(73) Assignee: FMC Corporation, Philadelphia, PA (US)

( * ) Notice: Subject to any disclaimer, the term of this patent is extended or adjusted under 35 U.S.C. 154(b) by 240 days.

(21) Appl. No.: 13/048,025

(22) Filed: Mar. 15, 2011

Related U.S. Application Data

(60) Provisional application No. 61/315,582, filed on Mar. 19, 2010.

(51) Int. Cl.
*A01M 1/20* (2006.01)
*A01M 13/00* (2006.01)

(52) U.S. Cl.
USPC .............................. 43/129; 43/132.1; 43/123

(58) Field of Classification Search
USPC ................................. 43/123–125, 129, 132.1
IPC .................................... A01M 1/20,13/00, 17/00
See application file for complete search history.

(56) References Cited

U.S. PATENT DOCUMENTS

| | | | |
|---|---|---|---|
| 8,551,510 B2 * | 10/2013 | Bedoukian | 424/405 |
| 2011/0213038 A1 * | 9/2011 | Bedoukian | 514/678 |
| 2012/0096761 A1 * | 4/2012 | Smith | 43/132.1 |

FOREIGN PATENT DOCUMENTS

WO   WO 2010/122334 A1   10/2010

OTHER PUBLICATIONS eHOW "How to Kill Bed Bugs with Alcohol" [online Feb. 4, 2010] http://www.ehow.com/how_4913582_kill-bed-bugs-alcohol.html. pp. 1 to 3.
Wikipedia "Bedbug" [online Feb. 4, 2010] http://en.wikipedia.org/wiki/Bedbug. Domestic Treatment on pp. 1 & 15.
Alameda County Vector Control Services District, [online Feb. 4, 2010] http://www.acvcsd.org, 1131 Harbor Bay Parkway, Alameda, CA 94502. 2 pages.
American Pest Control, [online Feb. 4, 2010] http://www.pestcentral.com/bedbugs/bedbug-dos-and-donts.html. pp. 1 to 3.

* cited by examiner

*Primary Examiner* — Darren W Ark
*Assistant Examiner* — Timothy Schwarz
(74) *Attorney, Agent, or Firm* — FMC Corporation

(57) ABSTRACT

The present invention provides an environmentally safe and highly effective method for killing bed bugs by enclosing infested items, belongings or possessions in a sealed container along with a small amount of certain solvents, the vapors of which kill bed bugs that are present.

13 Claims, No Drawings

CONTROLLING BED BUGS WITH SOLVENT VAPORS

FIELD OF THE INVENTION

This invention relates to using solvent vapors to control bed bugs. In particular, solvent vapors kill and/or control bed bug populations within an enclosed space.

BACKGROUND OF THE INVENTION

Blood feeding insects such as bed bugs are nuisance pests that afflict humans, pets and domestic animals. Because of their cryptic behavior, the detection and control of the common bed bug, *Cimex lectularius*, is often very difficult and time consuming.

Bed bugs are difficult and expensive to kill and/or control once they have established a presence in a location. Common methods for controlling bed bugs include vacuuming and steam cleaning affected areas, washing bedding in very hot water, enclosing an infested mattress or bedding in a black plastic bag and placing the bag in direct sunlight on a hot day, contacting the insects with insecticides or desiccant powders or whole house fumigation with dangerous chemicals such as Vikane (sulfuryl fluoride). Extreme heat, for example, temperatures of greater than 140° F. for several hours, or extreme cold, minus 20° F. for several days are other methods that have been used to kill bed bugs. Spraying bed bugs with isopropyl alcohol is also known to kill the insects; however bed bugs must come into direct contact with the isopropyl alcohol in order for this treatment to be effective. Once the alcohol has evaporated, bed bugs that were not contacted with the alcohol are free to move about.

Bed bugs are able to cling to possessions and hide in small spaces so that they may easily be transported in a traveler's belongings. As a result, buildings where turnover of occupants is high, such as hotels, dormitories and apartments, are especially vulnerable to bed bug infestations.

Commercial bed bug monitors and traps have been used to detect and capture these insects for later identification. Safe disposal of trapped bed bugs or cleaning and decontamination of the monitors and traps is a concern as any surviving bed bugs could start a new infestation.

It would be most beneficial to provide a simple, inexpensive, environmentally safe, and highly effective method for killing bed bugs in infested areas and in items such as bedding, suitcases, personal possessions and belongings and bed bug monitors or traps.

SUMMARY OF THE INVENTION

It has been discovered that certain solvent vapors can effectively kill bed bugs. Very low concentrations of solvent vapors, for example, isopropyl alcohol, contained in an enclosed space can kill bed bugs that are in or on items, such as personal belongings, bed bug monitors and bed bug traps.

DETAILED DESCRIPTION OF THE INVENTION

The present invention provides an environmentally safe and highly effective method for killing bed bugs by enclosing infested items (e.g., belongings or possessions) in a sealed container along with a small amount of at least one solvent, the vapors of which kill bed bugs that are present. Compared to complicated treatments of expensive chemicals and processes that are disclosed in the literature, the present invention provides an inexpensive, very simple and safe method of killing bed bugs.

In one aspect of the present invention there is provided a method for killing bed bugs located in or on common household items such as furniture, bedding, mattresses, luggage, electronic equipment such as televisions, lamps and telephones, bed bug monitors and bed bug traps by enclosing such items in a sealed container along with a small amount of at least one solvent for a period of time to kill bed bugs that are present.

A preferred aspect of the present invention is a method for killing bed bugs comprising the steps of:
1) placing a bed bug infested item into a sealable container,
2) placing a solvent into the container, and
3) sealing the container.

It is preferred that the solvent have a low vapor pressure and that it be essentially odorless. Suitable solvents include alcohols such as methanol, ethanol, 1-propanol and isopropyl alcohol; ketones such as acetone; acetates such as ethyl acetate; alkanes such as hexane; aromatic hydrocarbons such as toluene; chlorinated alkanes such as methyl chloride and chloroform and organic solvents such as acetonitrile and mixtures thereof. A preferred solvent is an alcohol and more preferably isopropyl alcohol. In order for the solvent to be dispensed into the atmosphere of the sealed container, the solvent may be incorporated into a formulation which can be a gel form, a solid form, dissolved in a polar solvent such as water, encapsulated, or impregnated into or onto other materials. The solvent may be incorporated into an absorbent material, for example, but not limited to, paper, cotton batting, fiberized cellulose wood pulp, synthetic batting, polyester batting, felt, bonded carded webs, high density polyethylene sponge and high loft spunbond materials. One such dispensing device is commercially available individually wrapped isopropyl alcohol wipes. In order to regulate diffusion, a semi-permeable membrane can be used to encase the absorbent materials. The solvent can be dispensed from a container with a semi-permeable top or with a sealed top containing small holes to allow diffusion of the composition into the surrounding atmosphere.

It is preferred that the solvent vapors be present in the sealed container in a concentration of about 1% to 50% by volume saturation in air, more preferably in a concentration of about 2% to 10% by volume saturation in air.

Sealable containers which can be used in the present invention include those that do not absorb the solvent vapors or allow the solvent vapors to diffuse the sealable container. Moreover, the sealable container should be of sufficient size such that an object infested with bed bugs can be placed therein while leaving enough air space to allow circulation of the solvent vapors in and around the object. Suitable sealable containers include, but are not limited to plastic bags, for example, Ziploc® Smart Zip Seal™ Brand Bags from SC Johnson, metal containers, wood or plastic boxes, brief cases, suitcases, plastic wraps, aluminum foil and the like. If sealed properly, an entire room or building could function as a sealable container.

In a preferred embodiment of the present invention, there is provided a method of killing bed bugs in a sealed container by volatilizing an alcohol selected from the group consisting of methanol, ethanol, 1-propanol, isopropyl alcohol and mixtures thereof.

In another embodiment of the present invention, there is provided a method of killing bed bugs by volatilizing an alcohol selected from the group consisting of methanol, ethanol, 1-propanol, isopropyl alcohol and mixtures thereof in a bed bug infested closet, room, hallway or building and sealing the closet, room hallway or building.

Volatilization of the solvent can be accomplished by evaporation of the solvent at ambient temperature, maintaining the sealed container at an elevated temperature, for example, placing the sealed container in a warm area (sunlit area, warm oven or the like) or gently heating the solvent, for example with a commercial hand warmer. When maintaining the sealed container at an elevated temperature, it is preferred that the temperature be about 40° C., or less, so as to prevent possible damage to the item(s) within the sealed container. Similarly, if the sealed container is placed in a sunlit area, it is preferred that the contents of the sealed container be at a temperature of about 40° C., or less, so as to prevent possible damage to the item(s) within the sealed container.

The following examples further illustrate the present invention and include protocols for the evaluation of the method of the present invention but, of course, should not be construed as in any way limiting its scope.

Example 1

Alcohol Vapors Kill Bed Bugs in Sealed Containers

Into 13 inch by 6 inch (2000 mL) sealable plastic bags was placed a plastic insect monitor which took up about ¾ of the available space in the sealable bag. Five adult bed bugs (BB) (*Cimex lectularius*) or five bed bug nymphs (nymphs were contained in an open 20 mL glass vial) were introduced into the bag. A 1.5 inch by 1.5 inch square of paper towel was treated with an alcohol and placed into the plastic bag on top of the plastic fan so the bed bugs could not directly contact the alcohol dosed towel. Each plastic bag was sealed and maintained at ambient temperature, about 22° C., throughout the test. The percent mortality was determined at certain time intervals. Table 1 below summarizes the experimental data.

TABLE 1

Bed Bug Mortality Caused by Alcohol Vapors In Sealed Containers

| Treatment | % Mortality | | |
|---|---|---|---|
| | 45 minutes | 60 minutes | 75 minutes |
| Control (No solvent) | 0 | 0 | 0 |
| Methanol 100% Adult BB | | | |
| 2.0 mL | ND | 80 | ND |
| *Ethanol 70% Adult BB | | | |
| 2.0 mL | ND | 60 | ND |
| Ethanol 100% Adult BB | | | |
| 2.0 mL | ND | 100 | ND |
| Isopropanol 100% Adult BB | | | |
| 0.1 mL | 40 | 80 | 100 |
| 0.2 mL | 60 | 80 | 100 |
| 0.3 mL | 40 | 80 | 100 |
| 0.4 mL | 60 | 100 | 100 |
| 0.5 mL | 60 | 100 | 100 |
| 1.0 mL | 60 | 100 | 100 |
| 3.0 mL | ND | 100 | ND |
| Isopropanol 100% Nymphs | | | |
| 1.0 mL | 100 | 100 | ND |

*Aqueous 70% ethanol solution
ND = No Data

Alcohol vapors contained in a sealed plastic bag effectively killed bed bugs in less than two hours.

Example 2

Isopropyl Alcohol Vapors Kill Bed Bugs in Sealed Containers

Into a 13 inch by 6 inch (2000 mL) sealable plastic bag was placed a glass HPLC vial containing a small strip of filter paper and 5 adult bed bugs (*Cimex lectularius*) and a 20 mL glass vial containing a 1 inch by 1 inch piece of paper towel treated with isopropyl alcohol (IPA). The plastic bag was sealed and maintained at ambient temperature, about 22° C., throughout the test. The percent bed bug mortality was determined at certain time intervals. Table 2 below summarizes the experimental data.

TABLE 2

Bed Bug Mortality Caused by Isopropyl Alcohol Vapors In Sealed Containers

| IPA Treatment amount mL | % Mortality | | | |
|---|---|---|---|---|
| | 30 minutes | 45 minutes | 60 minutes | 75 minutes |
| Control (NO solvent) | 0 | 0 | 0 | 0 |
| 2.0 | 20 | 40 | 100 | 100 |
| 1.0 | 20 | 40 | 80 | 80 |
| 0.5 | 0 | 0 | 100 | 100 |
| 0.25 | 0 | 60 | 80 | 80 |
| 0.125 | 20 | 40 | 60 | 60 |
| 0.625 | 0 | 20 | 60 | 80 |
| 0.312 | 20 | 20 | 40 | 60 |
| 0.156 | 20 | 40 | 80 | 100 |
| 0.078 | 0 | 20 | 100 | 100 |
| 0.039 | 0 | 20 | 60 | 100 |

Isopropyl alcohol vapors contained in a sealed plastic bag effectively killed bed bugs in less than two hours.

Example 3

Isopropyl Alcohol Vapors Kill Bed Bugs in Sealed Containers

Into a 13 inch by 6 inch (2000 mL) sealable plastic bag was placed a glass HPLC vial containing a small strip of filter paper and 2 adult bed bugs (Cimex lectularius) and a 20 mL glass vial containing isopropyl alcohol (IPA). The plastic bag was sealed and maintained at ambient temperature, about 22° C., throughout the test. The percent bed bug mortality was determined at certain time intervals. Table 3 below summarizes the experimental data.

TABLE 3

Bed Bug Mortality Caused by Isopropyl Alcohol Vapors In Sealed Containers

| IPA Treatment amount | % Mortality | | |
|---|---|---|---|
| mL | 15 minutes | 30 minutes | 45 minutes |
| Control (No solvent) | 0 | 0 | 0 |
| 2.0 | 0 | 0 | 100 |
| 1.0 | 0 | 0 | 100 |
| 0.5 | 0 | 0 | 100 |
| 0.25 | 0 | 0 | 100 |
| 0.125 | 0 | 0 | 100 |
| 0.625 | 0 | 0 | 100 |
| 0.312 | 0 | 0 | 100 |
| 0.156 | 0 | 0 | 100 |
| 0.078 | 0 | 0 | 100 |
| 0.039 | 0 | 0 | 100 |

Isopropyl alcohol vapors contained in a sealed plastic bag effectively killed bed bugs in less than 1 hour.

Example 4

Solvent Vapors Kill Bed Bugs in Sealed Containers

Into 13 inch by 6 inch (2000 mL) sealable plastic bags was placed a plastic insect monitor which took up about ¾ of the available space in the sealable bag. Five adult bed bugs (BB) (Cimex lectularius) were introduced into the bag. A 1.5 inch by 1.5 inch square of paper towel was treated with 2 mL of a solvent and placed into the plastic bag on top of the plastic fan so the bed bugs could not directly contact the solvent dosed towel. Each plastic bag was sealed and maintained at ambient temperature, about 22° C., throughout the test. The percent mortality was determined after one hour. Table 4 below summarizes the experimental data.

TABLE 4

Bed Bug Mortality Caused by Solvent Vapors in Sealed Containers

| Treatment Solvent (2 mL) | % Mortality after 1 hour |
|---|---|
| Control (No solvent) | 0 |
| Acetone | 100 |
| Acetonitrile | 60 |
| Methyl chloride | 100 |
| Ethyl acetate | 100 |
| Toluene | 100 |
| Chloroform | 100 |
| Hexane | 100 |
| Decyl alcohol | 0 |
| Octane | 0 |

As can be seen from the test data above, bedbugs are effectively controlled by vapors of certain solvents.

Example 5

Isopropyl Alcohol Vapors Kill Bed Bugs Inside a Laptop Computer Enclosed in a Sealed Container Several ports were removed from the side of a laptop computer creating void spaces within the computer. Five HPLC vials containing 2 adult bed bugs (Cimex lectularius) each, the tops of which were covered with a screen so the bed bugs could not escape, were placed into the computer voids. The infested laptop was placed into a sealable plastic bag along with a 20 mL glass vial containing a 2 inch by 2 inch square of paper towel to which was added 0.5 mL of isopropyl alcohol. The plastic bag was sealed and kept at ambient temperature for about 4 hours. The plastic bag was opened and the vials containing the bed bugs were examined. All bed bugs were alive. The vials were replaced within the computer voids and the original 2 inch by two inch square of paper towel was replaced with a new square of paper towel treated with 0.5 mL of isopropyl alcohol. The plastic bag was sealed and kept at ambient temperature, about 22° C., for about 18 hours. The plastic bag was opened and the vials containing the bed bugs were examined. All bed bugs were dead. The laptop computer was not damaged.

Example 6

Isopropyl Alcohol Vapors Kill Bed Bugs in a Suit Case Enclosed in a Sealed Container A cloth covered suit case, with dimensions of 20.5 inches by 14.5 inches by 7.5 inches (2230 cu. in) and a zipper closure device, was infested with bed bugs by placing HPLC vials containing 2 adult bed bugs (Cimex lectularius) each, the tops of which were covered with a screen so the bed bugs could not escape, throughout the main storage area of the suit case (4 vials) and affixing one vial to the outside of the suit case. A paper towel containing 7.0 mL of isopropyl alcohol was placed in the main storage area of the suit case and the case was closed with the zipper. The infested suit case was double bagged inside heavy polypropylene plastic bags along with a paper towel containing 3.5 mL of isopropyl alcohol. The polypropylene bags were sealed with tape and maintained at ambient temperature, about 22° C., for 24 hours. The plastic bags were opened and the vials containing the bed bugs were examined. All bed bugs were dead.

Example 7

Isopropyl Alcohol Vapors Kill Bed Bugs in Personal Belongings within a Suitcase Enclosed in a Sealed Container Into a cloth covered suit case, with dimensions of 20.5 inches by 14.5 inches by 7.5 inches and a zipper closure device, was placed 3.75 pounds of tee shirts. The suit case was infested with bed bugs by placing HPLC vials containing 2 adult bed bugs (Cimex lectularius) each, the tops of which were covered with a screen so the bed bugs could not escape, throughout the main storage area of the suit case (4 vials) and affixing one vial to the outside of the suit case. A paper towel containing 7.0 mL of isopropyl alcohol was placed in the main storage area of the suit case and the case was closed with the zipper. The infested suit case was double bagged inside heavy polypropylene plastic bags along with a paper towel containing 3.5 mL of isopropyl alcohol. The polypropylene bags were sealed with tape and maintained at ambient temperature, about 22° C., for 24 hours. The plastic bags were opened and the vials containing the bed bugs were examined All bed bugs were dead.

Example 8

Isopropyl Alcohol Vapor Concentration Versus Time to Kill Bed Bugs in a Sealed Container An experiment was performed to determine the isopropyl alcohol (IPA) concentration versus time to kill bed bugs in the following manner:

Isopropyl alcohol was placed into 650 mL glass bottles and the bottles were sealed with a polypropylene cap. The isopropyl alcohol was allowed to evaporate completely. Each bottle was opened, a glass vial containing 5 adult bed bugs (*Cimex lectularius*), the top of the vial was covered with a screen so the bed bugs could not escape, was quickly placed on the bottom of the bottle and the cap replaced. The bottles were maintained at ambient temperature, about 22° C. The number of dead bed bugs was assessed by visual examination of the bed bugs at 30 minutes, 1 hour, 2 hours, 3 hours, 4 hours, 24 hours and 48 hours. A bed bug was considered dead if there was no movement displayed after gently shaking the bottle. Table 5 below summarizes the amount of isopropyl alcohol used and the % mortality of bed bugs from this experiment.

TABLE 5

% Mortality of Bed Bugs Contacted With Different Concentrations Of Isopropyl Alcohol In Sealed Containers

| Amount of IPA (ml) | % Concentration (wt/wt) in Air Volume | % Mortality | | | | | | |
|---|---|---|---|---|---|---|---|---|
| | | 0.5 hour | 1 hour | 2 Hour | 3 Hour | 4 Hour | 24 Hour | 48 Hour |
| 0.25 | 23.8 | 0 | 60 | 100 | 100 | 100 | 100 | 100 |
| 0.125 | 11.9 | 0 | 20 | 100 | 100 | 100 | 100 | 100 |
| 0.063 | 6.0 | 0 | 20 | 100 | 100 | 100 | 100 | 100 |
| 0.03 | 3.0 | 0 | 0 | 40 | 40 | 100 | 100 | 100 |
| 0.015 | 1.5 | 0 | 0 | 0 | 0 | 0 | 100 | 100 |
| 0.0075 | 0.75 | 0 | 0 | 0 | 0 | 0 | 40 | 100 |
| 0.004 | 0.4 | 0 | 0 | 0 | 0 | 0 | 0 | 0 |
| Control | 0 | 0 | 0 | 0 | 0 | 0 | 0 | 20 |

As can be seen from the test data above, bedbugs are effectively controlled within 4 hours at ambient temperature when vapors of isopropyl alcohol are present in concentrations of 3% or higher. Lower concentrations are effective when bed bugs are exposed to the vapors for longer periods of time.

Example 9

Isopropyl Alcohol Vapors Kill Bed Bugs at Elevated Temperatures in Sealed Containers An experiment was performed to determine the isopropyl alcohol (IPA) concentration versus temperature to kill bed bugs in the following manner:

Isopropyl alcohol, 0.03 mL, was placed into three 650 mL glass bottles and each bottle was sealed with a polypropylene cap. The isopropyl alcohol was allowed to evaporate completely, providing about a 3% concentration of alcohol vapor in the air. Each bottle was opened and a glass vial containing 5 adult bed bugs (*Cimex lectularius*), the top of the vial was covered with a screen so the bed bugs could not escape, was quickly placed on the bottom of the bottle and the cap replaced. One test flask was maintained at 24° C. (ambient temperature), one at 30° C. and one at 39° C. A control bottle was included for each temperature and contained no isopropyl alcohol. The number of dead bed bugs was assessed by visual examination of the bed bugs at 30 minutes, 80 minutes, 130 minutes, 180 minutes, 240 minutes and 300 minutes. A bed bug was considered dead if there was no movement displayed after gently shaking the bottle. Table 6 below summarizes the amount of isopropyl alcohol used and the % mortality of bed bugs from this experiment.

Table 6

% Mortality of Bed Bugs Contacted With Isopropyl Alcohol At Elevated Temperatures In Sealed Containers

| Temperature | % Mortality | | | | | |
|---|---|---|---|---|---|---|
| | 30 Minutes | 80 Minutes | 130 Minutes | 180 Minutes | 240 Minutes | 300 Minutes |
| 24° C. | 0 | 0 | 0 | 0 | 60 | 80 |
| 24° C. Control | 0 | 0 | 0 | 0 | 0 | 0 |
| 30° C. | 0 | 0 | 40 | 40 | 100 | 100 |
| 30° C. Control | 0 | 0 | 0 | 0 | 0 | 0 |
| 39° C. | 0 | 40 | 40 | 100 | 100 | 100 |
| 39° C. Control | 0 | 0 | 0 | 0 | 0 | 0 |

As can be seen from the test data above, bedbugs are more quickly killed by isopropyl alcohol vapors at elevated temperatures when compared to ambient temperature.

Example 10

Isopropyl Alcohol Vapor Concentration to Control the Hatching of Bed Bug Eggs in a Sealed Container Bed bugs were allowed to lay eggs on red construction paper for easy visualization. The paper containing the eggs was cut to sections containing about 50 to 55 eggs. A mid-embryogenic vitelline membrane forms during egg development, usually about 6 to 7 days after being layed that is highly impermeable (e.g., prior to this membrane formation, permeabilized eggs will uptake zenobiotics which doesn't occur after vitelline membrane formation), therefore pre-membrane development eggs that were 3-4 days old and post membrane development eggs that were 10-11 days old were used. Complete embryonic development typically requires 10-12 days at 25° C. Isopropyl alcohol was placed into 650 mL glass bottles and then sealed with a polypropylene cap (125 ul IPA or 3% vapor concentration). The isopropyl alcohol was allowed to evaporate completely. A one inch wet dental wick was included to provide moisture in each bottle. Each bottle was opened, a glass vial containing the cut paper with 50 bed bugs eggs (*Cimex lectularius*), the top of the vial was covered with a screen so any hatched bed bugs could not escape, was quickly placed on the bottom of the bottle and the cap replaced. The bottles were maintained at 25° C. Bed bug eggs were exposed to the alcohol vapor for 2.5 hours, 5.5 hours, 11 hours, 24 hours or 8 days. A control test containing no alcohol was also included. Following IPA exposure, the bed bug eggs were returned to a fresh, humidified bottle. The numbers of live embryos and/or hatched nymphs were scored every four days during development. A bed bug embryo was considered dead if development ceased, melanized, or a nymph failed to emerge following normal development. Tables 7A and 7B below summarizes the isopropyl alcohol exposure time at 3% vapor concentration and the % mortality of bed bug embryos from this experiment.

TABLE 7A

Percent of Bed Bug Eggs Hatching After Contact With Isopropyl Alcohol Using 3-4 Day Old Eggs

| Exposure to Isopropyl Alcohol (Hrs) | % Bed Bug Eggs Hatch | |
| --- | --- | --- |
| | 4 days after treatment | 8 days after treatment |
| 2.5 | 82 | 100 |
| 5.5 | 96 | 100 |
| 11.0 | 78 | 100 |
| 24.0 | 0 | 10 |
| Continuous | ND | 0 |
| Control | 66 | 100 |

TABLE 7B

% Mortality of Bed Bug Eggs Contacted With Isopropyl Alcohol Using 10-11 Day Old Eggs

| Exposure to Isopropyl Alcohol (Hrs) | % Bed Bug Hatch | |
| --- | --- | --- |
| | 4 days after treatment | 8 days after treatment |
| 2.5 | 100 | 100 |
| 5.5 | 100 | 100 |
| 11.0 | 83 | 83 |
| 24.0 | 0 | 0 |
| Continuous | ND | 0 |
| Control | 100 | 100 |

Example 11

Isopropyl Alcohol Vapor Control of First Instar Bed Bug Nymphs in a Sealed Container Isopropyl alcohol (0.03 mL, 0.06 mL, 0.125 ml; to provide 3%, 6% and 12% vapor, respectively) was placed into 650 ml bottles and then sealed with a polypropylene cap. The isopropyl alcohol was allowed to evaporate completely. A one inch wet dental wick was included to provide moisture during the study. Each bottle was opened, a glass vial containing from 26 to 65 first instar bed bugs nymphs (1-3 days old, *Cimex lectularius*), the top of the vial was covered with a screen so the bed bugs could not escape, was quickly placed on the bottom of the bottle and the cap replaced. The flasks were maintained at 25° C. Bed bug nymphs were exposed to the alcohol atmosphere for 2.5 hours, 5.5 hours, 12 hours or 24 hours. A control test having no alcohol was also included. Following exposure to isopropyl alcohol, the bed bug nymphs were returned to a fresh, humidified bottle. The numbers of live nymphs were scored after 24 hours. A bed bug nymph was considered dead if there was no movement after gentle probing. Table 8 below summarizes the isopropyl alcohol exposure time at various vapor concentrations, exposure times and the % mortality of bed bug nymphs from this experiment.

TABLE 8

Percent Control of First Instar Bed Bugs Nymphs With Isopropyl Alcohol Vapor

| Exposure to Isopropyl Alcohol (Hrs) | Amount of Isopropyl Alcohol in Bottle (mL) | % Control |
| --- | --- | --- |
| Control | 0 | 0 |
| 2.5 | 0.03 | 0 |
| 2.5 | 0.06 | 2.2 |
| 2.5 | 0.125 | 20.4 |
| 5.5 | 0.03 | 65.4 |
| 5.5 | 0.06 | 100 |
| 5.5 | 0.125 | 100 |
| 12 | 0.03 | 100 |
| 12 | 0.06 | 100 |
| 12 | 0.125 | 100 |
| 24 | 0.03 | 100 |
| 24 | 0.06 | 100 |
| 24 | 0.125 | 100 |

Those of ordinary skill in the art will appreciate that variations of the invention may be used and that it is intended that the invention may be practiced otherwise than as specifically described herein. Accordingly, this invention includes all modifications encompassed within the spirit and scope of the invention as defined by the following claims.

What is claimed is:

1. A method for killing bed bugs consisting of the steps of:
   1) placing a bed bug infested item into a sealable container,
   2) placing only a solvent selected from the group consisting of methanol, ethanol, 1-propanol, isopropyl alcohol, acetone, ethyl acetate, hexane, toluene, methyl chloride, chloroform, and acetonitrile and the group includes mixtures consisting of solvents selected only from said solvent group into the container, and
   3) sealing the container.

2. The method of claim 1 wherein the solvent is selected from the group consisting of methanol, ethanol, 1-propanol, and isopropyl alcohol.

3. The method of claim 2 wherein the solvent is present in the sealed container in a concentration of about 1% to 50% by volume saturation in air.

4. The method of claim 3 wherein the solvent is present in the sealed container in a concentration of about 2% to 10% by volume saturation in air.

5. The method of claim 3 wherein the solvent is isopropyl alcohol.

6. The method of claim 1 wherein the sealed container is maintained at ambient temperature until said bed bugs are killed.

7. The method of claim 1 wherein the sealed container is maintained at a temperature of about 40° C., or less, until said bed bugs are killed.

8. The method of claim 1 wherein the sealed container is maintained at a temperature of about 40° C., or less to decontaminate an infested item selected from the group consisting of electrical equipment, clothes, luggage and insect monitors.

9. A method for killing bed bug eggs consisting of the steps of:
   1) placing a bed bug egg infested item into a sealable container, 2) placing only a solvent selected from the group consisting of methanol, ethanol, 1-propanol, isopropyl alcohol, acetone, ethyl acetate, hexane, toluene, methyl chloride, chloroform, and acetonitrile and the group includes mixtures consisting of solvents selected only from said solvent group into the container, and 3) sealing the container.

10. The method of claim 9 wherein the solvent is isopropyl alcohol.

11. The method of claim 9 wherein the sealed container is maintained at ambient temperature until said bed bugs are killed.

12. The method of claim 9 wherein the sealed container is maintained at a temperature of about 40° C., or less, until said bed bugs are killed.

13. The method of claim 9 wherein the sealed container is maintained at a temperature of about 40° C., or less to decontaminate an infested item selected from the group consisting of electrical equipment, clothes, luggage and insect monitors.

* * * * *